(12) United States Patent
Solomon et al.

(10) Patent No.: US 9,009,370 B2
(45) Date of Patent: Apr. 14, 2015

(54) INTELLIGENT DATA BUFFERING BETWEEN INTERFACES

(71) Applicant: LSI Corporation, San Jose, CA (US)

(72) Inventors: Richard Solomon, Colorado Springs, CO (US); Eugene Saghi, Colorado Springs, CO (US); John C. Udell, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/799,037

(22) Filed: Mar. 13, 2013

(65) Prior Publication Data

US 2014/0250246 A1  Sep. 4, 2014

Related U.S. Application Data

(60) Provisional application No. 61/772,087, filed on Mar. 4, 2013.

(51) Int. Cl.
| | | |
|---|---|---|
| *G06F 5/00* | (2006.01) |
| *G06F 3/00* | (2006.01) |
| *G06F 13/38* | (2006.01) |
| *G06F 3/06* | (2006.01) |
| *G06F 5/14* | (2006.01) |

(52) U.S. Cl.
CPC ............ *G06F 13/385* (2013.01); *G06F 3/0656* (2013.01); *G06F 5/14* (2013.01)

(58) Field of Classification Search
CPC .................................. G06F 3/0656; G06F 5/14
See application file for complete search history.

(56) References Cited

U.S. PATENT DOCUMENTS

| | | | |
|---|---|---|---|
| 6,970,392 B1 * | 11/2005 | Au et al. ........................ 365/221 |
| 7,603,503 B1 | 10/2009 | Hutsell et al. |
| 7,991,927 B2 | 8/2011 | Udell et al. |
| 2007/0260782 A1 * | 11/2007 | Shaikli ............................ 710/52 |

* cited by examiner

*Primary Examiner* — Zachary K Huson
(74) *Attorney, Agent, or Firm* — Duft Bornsen & Fettig LLP; Gregory T. Fettig

(57) ABSTRACT

A dynamically controllable buffering system includes a data buffer that is communicatively coupled between first and second data interfaces and operable to perform as an elasticity first-in-first-out buffer in a first mode and to perform as a store-and-forward buffer in a second mode. The system also includes a controller that is operable to detect data rates of the first and second data interfaces, to operate the data buffer in the first mode when the first data interface has a data transfer rate that is faster than a data transfer rate of the second data interface, and to operate the data buffer in the second mode when the second data interface has a data transfer rate that is faster than the data transfer rate of the first data interface.

12 Claims, 6 Drawing Sheets

|  | Link Speed | | |
|---|---|---|---|
| Link Width | 2.5 GT/s | 5.0 GT/s | 8.0 GT/s |
| X1 | 256 MB/s | 512 MB/s | 1 GB/s |
| X2 | 512 MB/s | 1 GB/s | 2 GB/s |
| X4 | 1 GB/s | 2 GB/s | 4 GB/s |
| X8 | 2 GB/s | 4 GB/s | 8 GB/s |
| X12 | 3 GB/s | 6 GB/s | 12 GB/s |
| X16 | 4 GB/s | 8 GB/s | 16 GB/s |

*FIG. 5*

| Bandwidth | Encoding |
|---|---|
| 256 MB/s - 1 GB/s | 000b |
| 2 GB/s | 001b |
| 3 GB/s | 010b |
| 4 GB/s | 011b |
| 6 GB/s | 100b |
| 8 GB/s | 101b |
| 12 GB/s | 110b |
| 16 GB/s | 111b |

*FIG. 6*

|  | Bus Width | | |
|---|---|---|---|
| Clock Speed | 64 | 128 | 256 |
| 200 MHz | 1.6 GB/s | 3.2 GB/s | 6.4 GB/s |
| 300 MHz | 2.4 GB/s | 4.8 GB/s | 9.6 GB/s |
| 400 MHz | 3.2 GB/s | 6.4 GB/s | 12.8 GB/s |
| 500 MHz | 4 GB/s | 8 GB/s | 16 GB/s |
| 600 MHz | 4.8 GB/s | 9.6 GB/s | 19.2 GB/s |

*FIG. 7*

| Bandwidth | Encoding |
|---|---|
| 1.6 GB/s | 000b |
| 2.4 GB/s | 001b |
| 3.2 GB/s | 010b |
| 4 GB/s - 4.8 GB/s | 011b |
| 6.4 GB/s | 100b |
| 8 GB/s - 9.6 GB/s | 101b |
| 12.8 GB/s | 110b |
| 16 GB/s - 19.2 GB/s | 111b |

*FIG. 8*

INTELLIGENT DATA BUFFERING BETWEEN INTERFACES

CROSS REFERENCE TO RELATED APPLICATIONS

This patent application claims priority to, and thus the benefit of an earlier filing data from, U.S. Provisional Patent Application No. 61/772,087 (filed Mar. 4, 2013), the entire contents of which are hereby incorporated by reference.

FIELD OF THE INVENTION

The invention generally relates to data buffering and more specifically to intelligently controlling buffering modes between interfaces.

BACKGROUND

Modern-day interfaces often contain backend functions with varying throughput capabilities. For example, a backend Universal Serial Bus (USB) 2.0 interface function does not have the same throughput capability as a Double Data Rate Random Access Memory 4 (DDR 4) interface. And, clock signals routed to the backend functions are occasionally operated at reduced frequencies to reduce power consumption causing their data transfer rates to change. Often, the backend functions share an external interface, such as a Peripheral Component Interconnect Express (PCIe) interface. The external interface may also vary depending on the configuration. For example, a x16 PCIe link that is capable of operating at 8.0 Giga Transfers per second (GT/s) may be changeably configured to operate at link widths of x12, x8, x4, x2, or x1 at speeds of 8 GT/s, 5 GT/s, or 2.5 GT/s, so as to reduce power consumption, to work around a degraded channel, etc.

SUMMARY

Systems and methods presented herein provide for intelligent data buffering between interfaces with changeable data transfer rates. In one embodiment, a data buffer is communicatively coupled between first and second data interfaces and operable to perform as an elasticity first-in-first-out buffer in a first mode and to perform as a store-and-forward buffer in a second mode. A controller is operable to detect data rates of the first and second data interfaces, to operate the data buffer in the first mode when the first data interface has a data transfer rate that is faster than a data transfer rate of the second data interface, and to operate the data buffer in the second mode when the second data interface has a data transfer rate that is faster than the data transfer rate of the first data interface.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 5-8 are tables illustrating exemplary connection speeds of the PCIe data interface and backend functions coupled through the data buffering system of FIG. 3.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
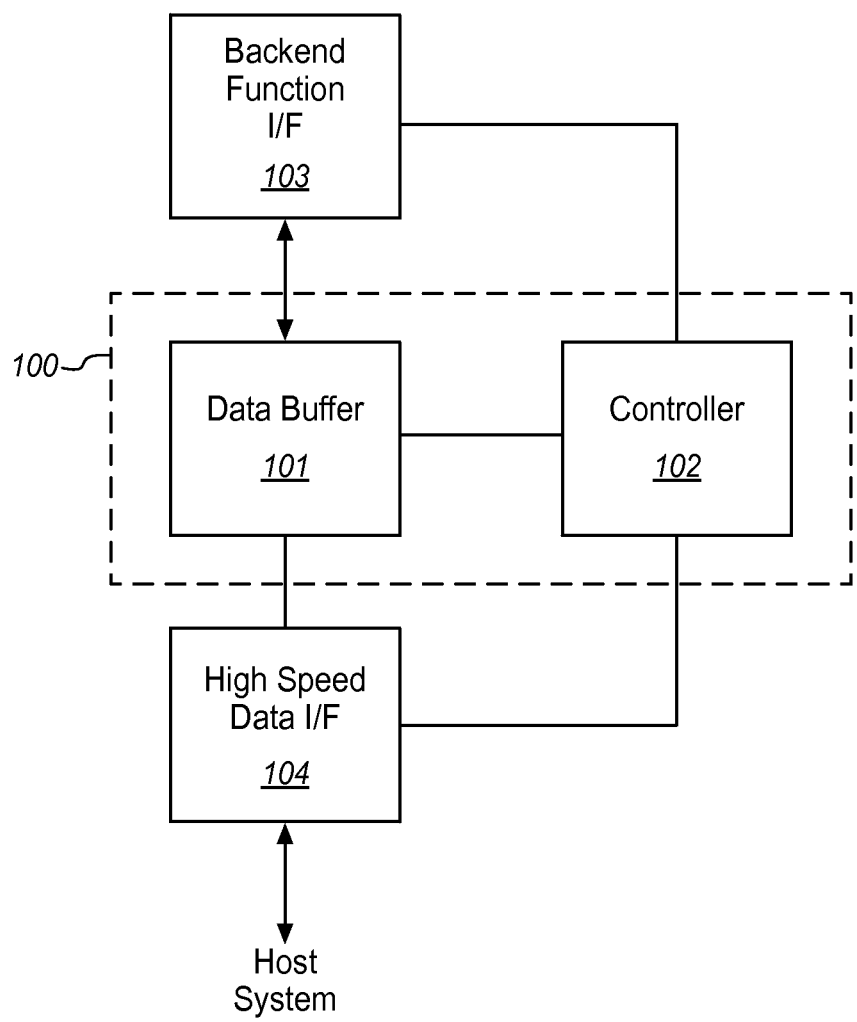
FIG. 1 is a block diagram of an exemplary data buffering system.

FIG. 1 is a block diagram of an exemplary data buffering system 100. The data buffering system 100 includes a data buffer 101 and a controller 102. The data buffer 101 is operable to transfer data between a backend function interface 103 and a high-speed data interface 104, such as a PCIe interface. For example, a host system coupled to the high-speed data interface 104 may perform I/O operations with a backend function through the backend function interface 103 by either transferring data to the interface 103 through the buffer 101 or by retrieving data from the backend function interface 103 through the buffer 101. In doing so, the host system communicates through the high-speed data interface 104 (e.g., to translate the data to/from the device).

The backend function interface 103 is any device, software, firmware or combination thereof operable to transfer data between a backend function and another interface. Examples of such include Universal Serial Bus (USB) interfaces, DDR memory interfaces, and the like. The buffer 101 is any device, software, firmware, or combination thereof operable to dynamically change its modes of storage and transfer between the backend function interface 103 and the high-speed data interface 104. The controller 102 is any device, software, firmware, or combination thereof operable to detect the data transfer rates of the backend function interface 103 and the high-speed data interface 104 to determine a mode of operation for the buffer 101. In one embodiment, the data buffering system 100 is configured as custom circuitry operable on the high-speed data interface 104. Additional details regarding the operation of the data buffering system 100 are now described with respect to FIG. 2.

Figure 2:
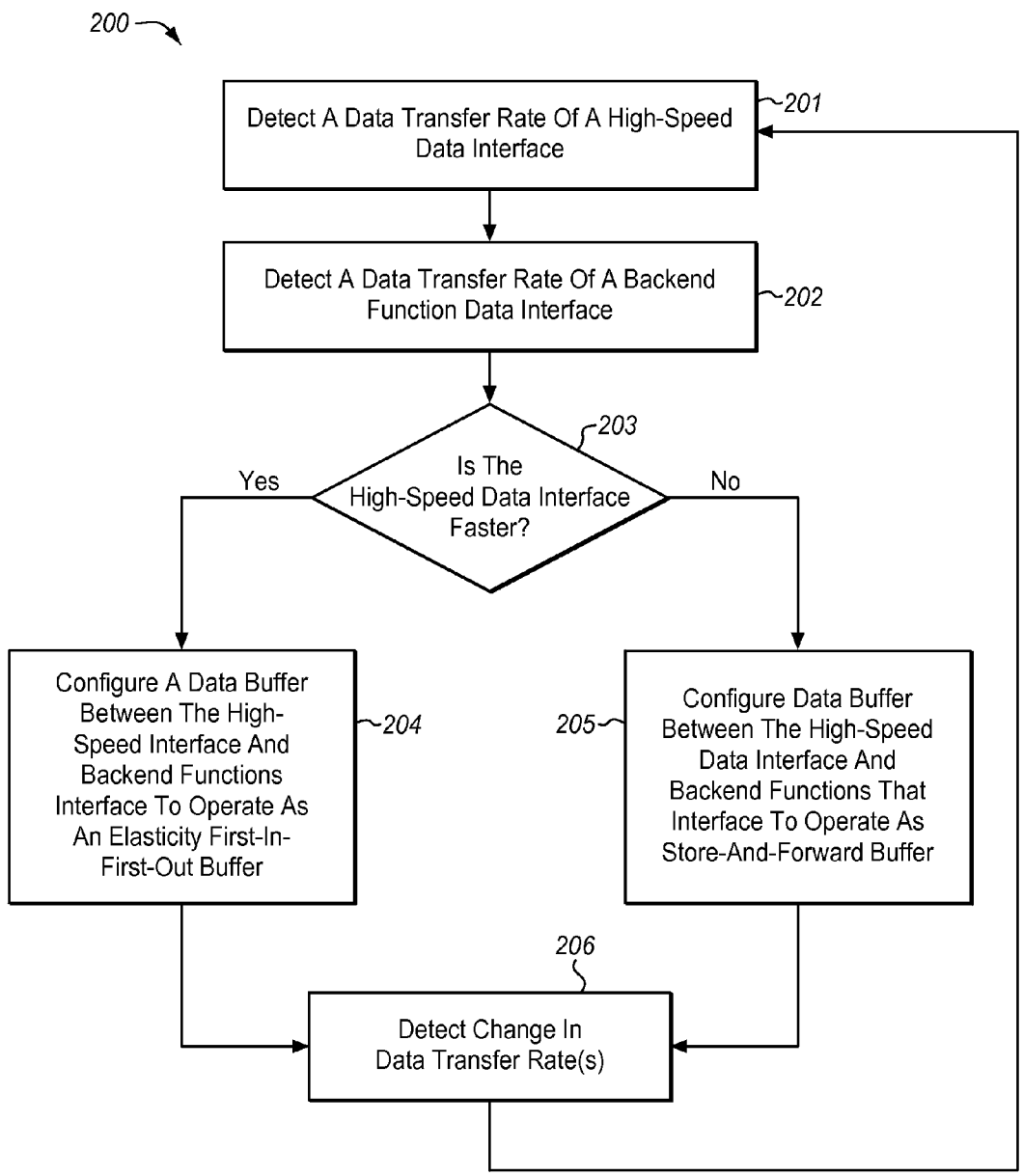
FIG. 2 is a flowchart of a process of the exemplary data buffering system of FIG.

FIG. 2 is a flowchart 200 of a process of the exemplary data buffering system 100 of FIG. 1. The data transfer functionality of the process can commence when the data buffering system 100 is coupled between the backend function interface 103 and the high-speed data interface 104. Once a link has been established between the high-speed data interface 104 and the backend function interface 103, the controller 102 detects a data transfer rate of the high-speed data interface 104, in the process element 201, and detects a data transfer rate of the backend function interface 103, in the process element 202. The controller 102 then determines whether the data transfer rate of the high-speed data interface 104 is faster than the data transfer rate of the backend function interface 103, in the process element 203.

If the data transfer rate of the high-speed data interface 104 is faster than the data transfer rate of the backend function interface 103, then the controller 102 configures the data buffer 101 to operate as an elasticity first-in-first-out (FIFO) buffer, in the process element 204. An elasticity FIFO buffer is a variable length buffer into which data may be entered at one rate and removed at another rate without changing the data sequence. Generally, most FIFO buffers have a variable length in that the input rate may vary while the output rate remains constant, or vice versa. The controller 102 may establish the length of the buffer 101 based on the detected data transfer rates. For example, assume that the high-speed data interface 104 is twice as fast as the backend function interface 103. The controller 102, after detecting this data transfer rate differential, may compute the size of the data buffer 101 to be roughly half as large as the total amount of data allocated for the pending transfer between the backend function interface 103 and the high-speed data interface 104 such that the last remaining data is transferred to the high-speed data interface 104 almost immediately after it enters the data buffer 101.

If the data transfer rate of the high-speed data interface 104 is slower than the transfer rate of the backend function interface 103, then the controller 102 configures the data buffer 101 to operate as a store-and-forward buffer, in the process element 205. A store and forward buffer is a data buffer that temporarily receives data from one device and temporarily stores it until it can be transferred to another device. Generally, all of the data from the transmitting device during any given transmission is stored in the buffer until it is transferred to the receiving device.

Regardless of the mode of the buffer 101, the controller 102 subsequently detects a change in the data transfer rate of the backend function interface 103 and/or the high-speed data interface 104, in the process element 206. For example, the backend function interface 103 and/or the high-speed data interface 104 may change its data transfer rate to conserve power, operate on a degraded link, etc. Once this change in data rate(s) occurs, a difference between the data rates may again exist, only this time in the opposite from what it was previously. This causes the controller 102 to once again detect the data transfer rate of the high-speed data interface 104, in the process element 201, and the data transfer rate of the backend function interface 103, in the process element 202 to establish which mode the buffer 101 should operate, the elasticity FIFO mode or the store-and-forward mode. Assuming that the backend function interface 103 is faster, the controller 102 directs the buffer 101 to operate as a store-and-forward buffer.

Although shown or described with respect to a single buffer 101 operable with a single controller 102, the invention is not so limited. Rather, the controller 102 may be operable to change the buffering modes of a plurality of buffers 101 operating in parallel with one another. An example of such can be found in a single high-speed PCIe data interface configured to communicate with a plurality of backend functions through a corresponding plurality of buffers 101 as illustrated FIG. 3.

Figure 3:
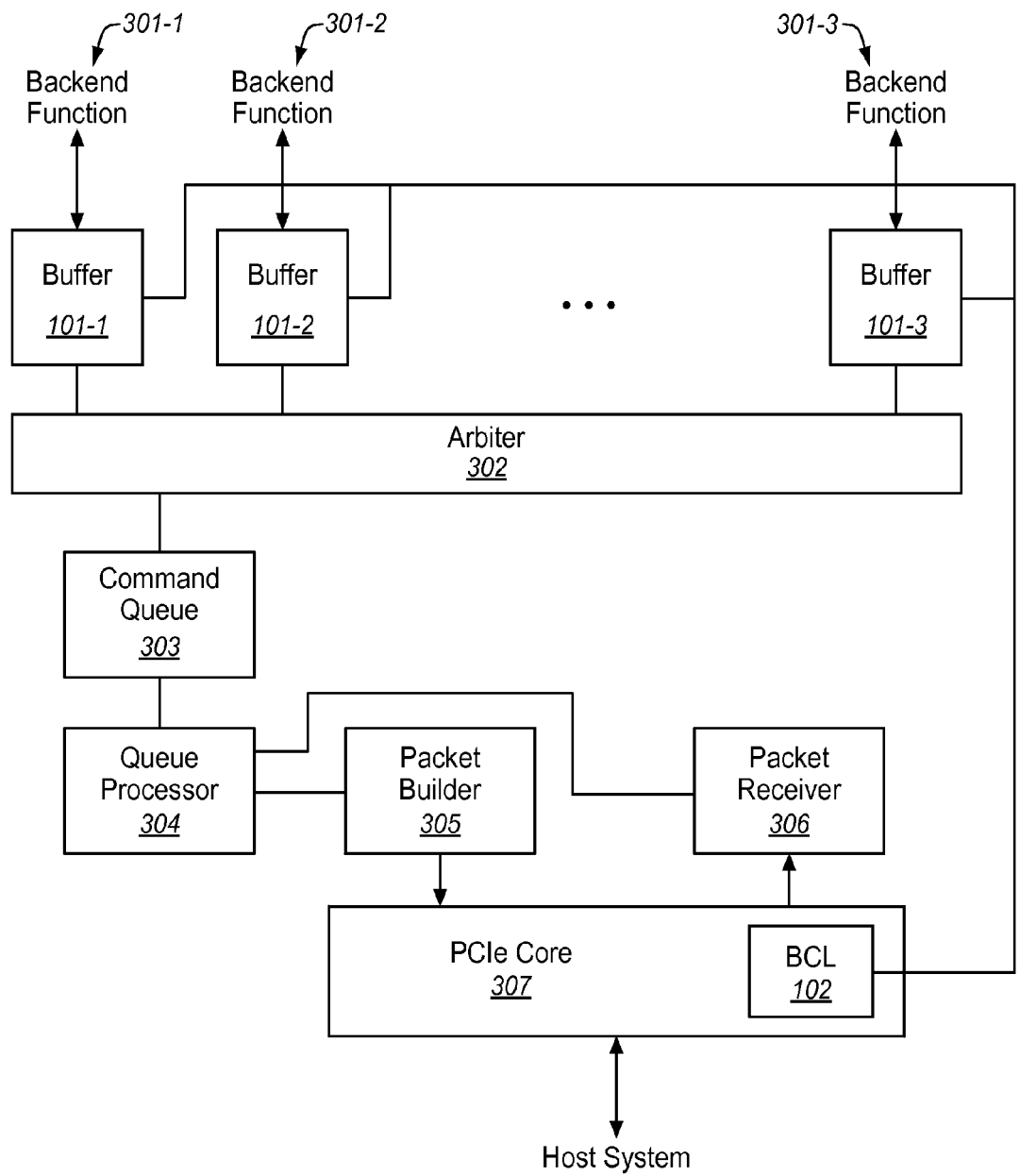
FIG. 3 is a block diagram of an exemplary data buffering system operable with a PCIe data interface.

FIG. 3 is a block diagram of an exemplary data buffering system operable with a PCIe data interface. In this embodiment, the PCIe data interface includes a PCIe core 307 operable to perform I/O operations with a plurality of backend functions 301-1-301-3 on behalf of a host system coupled to the PCIe data interface. The controller 102, configured with the PCIe core 307 buffer control logic, controls the modes of the buffers 101-1-101-3 as described above. The controller 102 is also operable to enhance the mode operability of the buffers 101-1-101-3 in conjunction with the command queue 303, the queue processor 304, the packet builder 305, and the packet receiver 306. To illustrate the functionality of the data buffering system with the PCIe data interface, the following example is provided.

EXAMPLE

The PCIe Interface operates as a x16 link via its PCIe core 307 (i.e., 16 serial lanes treated as a single link), where each lane operates at up to 8.0 GT/s. The PCIe Interface supports operation at link widths of x12, x8, x4, x2, and x1. At each link width, each link can operate at 8.0 GT/s per lane, 5.0 GT/s per lane, and 2.5 GT/s per lane. Fewer link widths and/or slower speeds may occasionally be desired (e.g., for reasons such as reduced-power modes, degraded operation modes, etc.). The controller 102, being part of the PCIe core 307, may inherently know the data transfer rate of the PCIe interface.

The backend functions 301-1-301-3 communicate to the PCIe Interface over their respective interfaces in a manner that may differ in terms of operating speeds and data-path widths from the PCIe Interface. A DDR 4 backend function (e.g., backend function 301-1) may interface to the PCIe core 307 with a data path that is 256 bits wide operating at 600 MHz through the buffer 101-1, while a USB 2.0 backend function (e.g., backend function 301-2) may interface to the PCIe core 307 with a data path that is 64 bits wide operating at 200 MHz through the buffer 101-2).

The data path width and clocking speed are functions of the throughput capabilities or needs of the backend functions 301-1-301-3. The interface clock speeds of the backend functions 301 may be reduced when operating in low-power modes. The controller 102, upon coupling the PCIe interface with a backend function 301, detects the data transfer rate of the backend function 301 over its established link. Each backend function 301 pushes data and commands to, or pulls data and completion notifications from, a dedicated buffer 101. The dedicated buffers 101-1-101-3 allow the backend functions 301-1-301-3 to move data in parallel and at their own individual rates.

When a controllable buffer 101 has a command ready to issue, the controllable buffer 101 arbitrates for access to the command queue 303 via the arbiter 302. After winning the arbitration, the controllable buffer 101 writes its command to the command queue 303. The queue processor 304 unloads the command from the command queue 303 and executes it. If the command is a write command, the queue processor 304 pulls data from the appropriate controllable buffer 101. The queue processor 304 directs the packet builder 305 to build PCIe packets from the data as it is read from the controllable buffer 101. The data is not buffered again to reduce latency. This means that all the required data should be available from the controllable buffer 101. In other words, the controllable buffer 101 has no mechanism to hold off the queue processor 304.

If the command is a read command, the queue processor 304 directs the packet receiver 306 to build a read packet for immediate transmission. When the data is returned, it is stored in the controllable buffer 101. Again, the controllable buffer 101 has no mechanism to hold off the incoming data. Once all the data for a command has been received, the queue processor 304 sends a completion indication to the controllable buffer 101.

With PCIe and other high-speed interfaces, two important concerns are throughput and latency. When only throughput is of concern, the controllable buffers 101 collect all data for a pending write command before issuing the command to move the data. In this way, the queue processor 304 does not wait for data to be ready for transmission. As soon as a command is ready to process, the queue processor 304 starts to transfer data building PCIe packets on the fly. In this way, throughput is maximized.

When latency is more of a concern, waiting for all the data to be present in the controllable buffer 101 is not optimal if the backend function 301 has a bandwidth that is as high or higher than the PCIe bandwidth of a particular link. Accordingly, the controllable buffer 101 issues the command to move the data as soon as the first data is received by the controllable buffer 101. Because the backend function 301 is fast enough to keep up with the PCIe link, the data is transferred in data transfer time and latency is reduced or minimized. And, throughput is positively impacted because the data is available as fast as the queue processor 304 can retrieve it.

Similarly, the controllable buffer 101 can reduce or minimize latency because the controllable buffer 101 indicates completion before all of the data has actually been written to the buffer 101. This is generally possible as long as the PCIe link bandwidth is as high or higher than the throughput of the backend function 301 interface. With early command completion, the backend function 301 can pull data from the controllable buffer 101 earlier and reduce latency.

Figure 4:
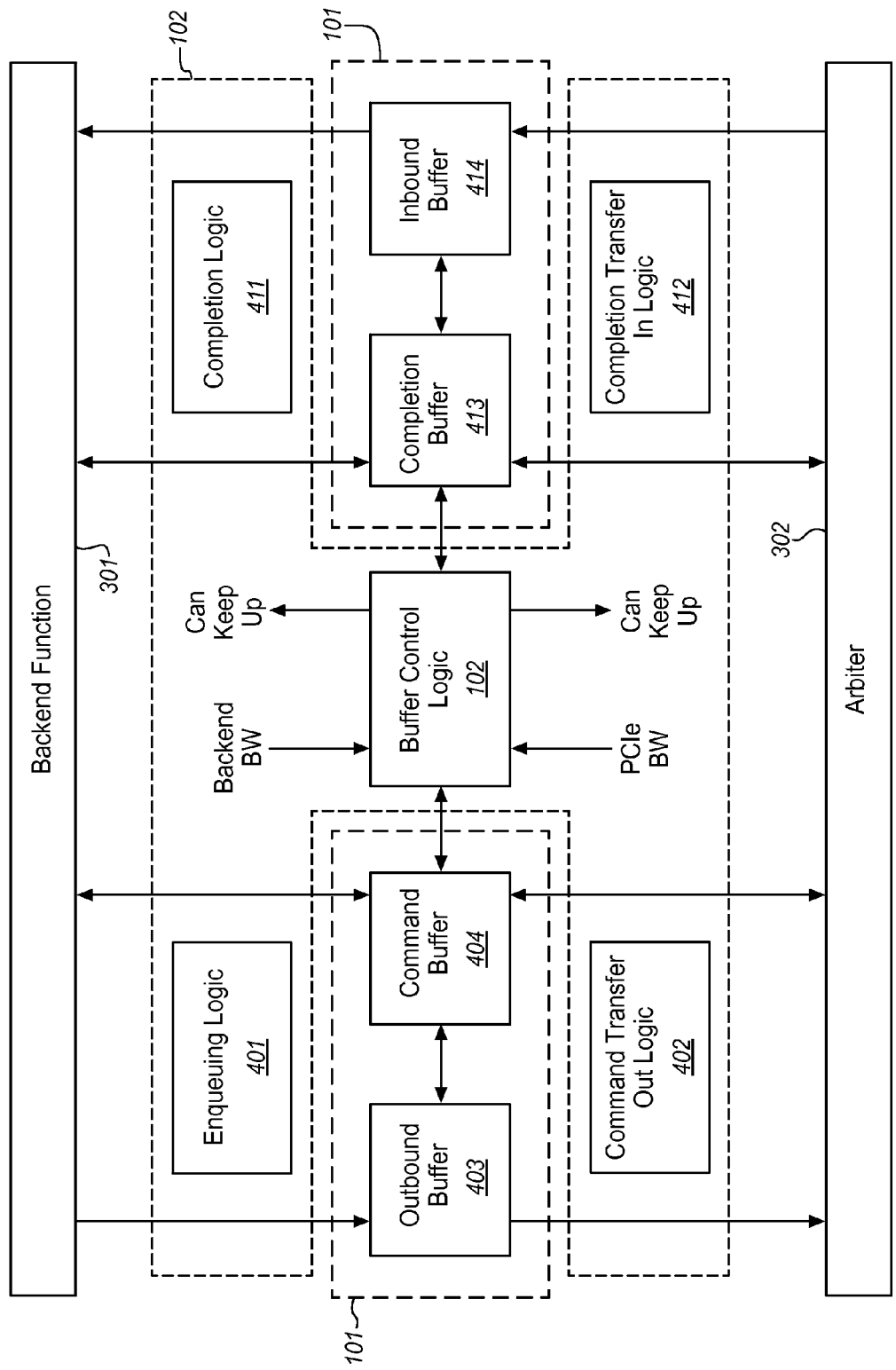
FIG. 4 is a more detailed block diagram of the exemplary data buffering system of FIG. 3.

Additionally, the controller 102 may weigh the PCIe link bandwidth against the bandwidth of the associated backend function 301 to dynamically determine when the queue processor 304 and the backend function 301 can begin to move data. For example, the controller 102 may, on-the-fly, adjust the size of the buffer 101 based on the data transfer rate differential between two interfaces as described above. FIG. 4 is a more detailed block diagram of the exemplary data buffering system of FIG. 3 that may be used to implement such. More specifically, FIG. 4 illustrates the architecture of the controllable buffer 101 to support dynamic latency adjustment.

In this embodiment, buffer control logic 410 uses encoded PCIe bandwidth and encoded backend bandwidth to generate "Can-Keep-Up" signals. One Can-Keep Up signal exists for each backend function 301. Each Can-Keep-Up signal indicates to the PCIe core 307 whether the associated backend function 301 can keep up or not. In the other direction, a signal is provided for each backend function 301 indicating that the PCIe core 307 can keep up.

For example, when data is moving from a backend function 301 to the PCIe core 307. The Can-Keep-Up signal for backend function 301 is asserted when the bandwidth of a backend function 301 is greater than or equal to the bandwidth of the PCIe core 307 and when the first few bytes of data for a command are present in the outbound buffer 403. When the bandwidth of a backend function 301 is less than or equal to the bandwidth of the PCIe core 307, the Can-Keep-Up signal for backend function 301 is asserted after most or all of the data for a command is present in the outbound buffer 403. The queue processor 304 starts building and sending PCIe packets when it has a command from a backend function 301 and when the Can-Keep-Up signal for the backend function 301 is asserted.

The Can-Keep-Up signal uses certain "encodings" to indicate to backend functions 301 and the PCIe core 307 how buffer 101 is operating. For data transfer from the backend function 301 to the PCIe core 307, the bandwidths of the PCIe core 307 are encoded according to the tables illustrated in FIGS. 5 and 6. The encoding is chosen such that the bandwidth of the backend function 301 is greater than or equal to the bandwidth of the PCIe core 307 when the encodings are the same or when the bandwidth encoding of the backend function 301 is larger than the bandwidth encoding of the PCIe core 307. When data flows in the opposite direction, the encodings are performed in similar fashion according to the tables illustrated in FIGS. 7 and 8 to ensure that the source interface can keep up.

More specifically, FIG. 5 shows the maximum throughput (i.e., bandwidth) achievable by the PCIe core 307 as a function of linkwidth and link speed. FIG. 6 shows possible encodings for the throughput numbers of FIG. 5. FIG. 7 shows the maximum backend function 301 throughput as a function of clock speed and data bus width. FIG. 8 shows possible encodings for the throughput numbers of FIG. 7. If the encoded throughput of the PCIe core 307 is greater than the encoded throughput for the backend function 301, then the PCIe core 307 can keep up. Similarly, if the encoded throughput for the backend function 301 is greater than the encoded throughput of the PCIe core 307, then the backend function 301 can keep up.

Returning to FIG. 4, flow of data and commands between backend function 301 and the PCIe core 307 takes place as follows. The backend function 301 issues commands that describe data movement. Inbound commands specify data movement from the PCIe core 307 to a backend function 301. Outbound commands specify data movement from a backend function 301 to the PCIe core 307. For inbound commands, a backend function 301 issues the command to command buffer 404. When permitted to do so by the buffer control logic 102, the command buffer 404 issues the inbound command to the PCIe core 307. The PCIe core 307 accepts the command and then sends one or more read request packets on a PCIe bus (not shown). The read data is returned and then written to the inbound buffer 414 by the PCIe core 307. The PCIe core 307 also issues a completion to the completion buffer 413. The completion buffer 413 issues a completion to the backend function 301, indicating that the command has been completed. The completion transfer in logic 412 coordinates the movement of data from the PCIe core 307 to the inbound buffer 414. The completion logic 411 coordinates the movement of data from the inbound buffer 414 to the backend function 301.

For outbound commands, the PCIe core 307 issues the command to the command buffer 404 and begins moving data to the outbound buffer 403 for transmission to the backend function 301. When permitted to do so by the buffer control logic 102, the command buffer 404 issues the outbound command to the PCIe core 307. The PCIe core 307 accepts the outbound command and starts pulling data from the outbound buffer 403 to build and send write request packets on the PCIe bus. When all of the packets associated with a command have been sent, the PCIe core 307 issues a completion to the completion buffer 413. The completion buffer 413 then issues the completion to the backend function 301. The enqueuing logic 401 coordinates the movement of data from the backend function 301 to the outbound buffer 403. The completion transfer out logic 402 coordinates the movement of data from the outbound buffer 403 to the PCIe core 307.

The arbiter 302 provides the arbitration logic that allows backend functions 301 to vie for access to the PCIe core 307. The buffer control logic 102 tracks available space in the outbound buffer 403 and the inbound buffer 414. The buffer control logic 102 also indicates to the command buffer 404 when it may issue an inbound command to the PCIe core 307 based on space available in the inbound buffer 414 to store data received for the command. The buffer control logic 102 also examines bandwidth of the backend functions 301 and the PCIe core 307 to assert the Can-Keep-Up signals to the backend functions 301 at the appropriate time (e.g., depending on the bandwidth signals "Backend BW" and "PCIe BW" and the amount of data already received and stored in the inbound buffer 414 and the outbound buffer 403, respectively). The buffer control logic 102 also indicates to the command buffer 404 when it may issue an outbound command to the PCIe core 307 based on space available in the outbound buffer 403 to store data received for the command from a backend function 301.

Figure 9:
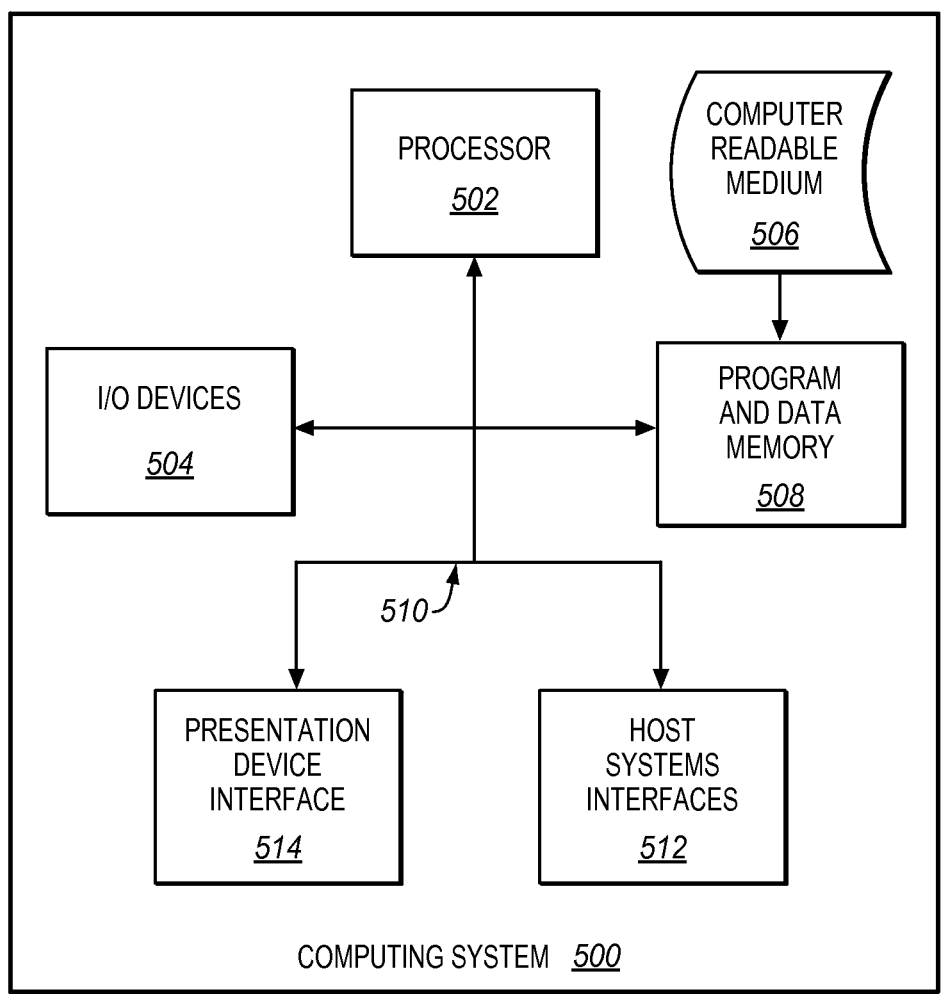
FIG. 9 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computing system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A system for buffering data, comprising:
a data buffer communicatively coupled between first and second data interfaces and operable to perform as an elasticity first-in-first-out buffer in a first mode and to perform as a store-and-forward buffer in a second mode; and
a controller operable to detect data rates of the first and second data interfaces, to operate the data buffer in the first mode when the first data interface has a data transfer rate that is faster than a data transfer rate of the second data interface, and to operate the data buffer in the second mode when the second data interface has a data transfer rate that is faster than the data transfer rate of the first data interface,
wherein the elasticity first-in-first-out buffer of the first mode comprises an amount of data buffering space that is adjusted based on the data transfer rates of the first and second data interfaces to transfer data as the elasticity first-in-first-out buffer is being filled, and
wherein the store-and-forward buffer of the second mode has a static amount of data buffering space that is operable to transfer data at the data rate of the first data interface after the store-and-forward buffer is filled with the data.

2. The system of claim 1, wherein:
the controller is further operable to detect an amount of data stored in the data buffer, to determine ability of the data buffer to transfer data when the first and second data interfaces have different data transfer rates, and to direct a receiving one of the first and second data interfaces to continue retrieving the data from the data buffer based on the ability of the data buffer to transfer data.

3. The system of claim 1, wherein:
the first data interface is a Peripheral Component Interconnect Express interface function and the second data interface is a backend function interface; and
the controller is configured with the Peripheral Component Interconnect Express interface.

4. The system of claim 1, wherein:
the controller is further operable to compute a size of the elasticity first-in-first-out buffer based on a data rate differential between the first and second data interfaces and to change the data buffer according to the computed size.

5. A method, comprising:
detecting a data transfer rate of a first data interface;
detecting a data transfer rate of a second data interface;
determining that the data transfer rate of the first data interface is faster than the data transfer rate of the second interface;
configuring a data buffer coupled between the first and second interfaces to operate as an elasticity first-in-first-out buffer;
determining that the data transfer rate of second data interface is faster than the data transfer rate of the first data interface after configuring the data buffer to operate as an elasticity first-in-first-out buffer; and
configuring the data buffer to operate as a store-and-forward buffer,
wherein the elasticity first-in-first-out buffer of the first mode comprises an amount of data buffering space that is adjusted based on the data transfer rates of the first and second data interfaces to transfer data as the elasticity first-in-first-out buffer is being filled, and
wherein the store-and-forward buffer of the second mode has a static amount of data buffering space that is operable to transfer data at the data rate of the first data interface after the store-and-forward buffer is filled with the data.

6. The method of claim 5, further comprising:
detecting an amount of data stored in the data buffer;
determining ability of the data buffer to transfer data when the first and second data interfaces have different data transfer rates; and directing a receiving one of the first and second data interfaces to continue retrieving the data from the data buffer based on the ability of the data buffer to transfer data.

7. The method of claim 5, further comprising:
the first data interface is a Peripheral Component Interconnect Express interface function and the second data interface is a backend function interface; and
the method is operable within the Peripheral Component Interconnect Express interface.

8. The method of claim 5, further comprising:
computing a size of the elasticity first-in-first-out buffer based on a data rate differential between the first and second data interfaces; and
changing the data buffer according to the computed size.

9. A non-transitory computer readable medium comprising instructions that, when executed by a processor, direct the processor to:
detect a data transfer rate of a first data interface;
detect a data transfer rate of a second data interface;
determine that the data transfer rate of the first data interface is faster than the data transfer rate of the second interface;
configure a data buffer coupled between the first and second interfaces to operate as an elasticity first-in-first-out buffer;
determine that the data transfer rate of second data interface is faster than the data transfer rate of the first data interface after configuring the data buffer to operate as an elasticity first-in-first-out buffer; and
configure the data buffer to operate as a store-and-forward buffer,
wherein the elasticity first-in-first-out buffer of the first mode comprises an amount of data buffering space that is adjusted based on the data transfer rates of the first and second data interfaces to transfer data as the elasticity first-in-first-out buffer is being filled, and
wherein the store-and-forward buffer of the second mode has a static amount of data buffering space that is operable to transfer data at the data rate of the first data interface after the store-and-forward buffer is filled with the data.

10. The computer readable medium of claim 9, further comprising instructions that direct the processor:
detect an amount of data stored in the data buffer;
determine ability of the data buffer to transfer data when the first and second data interfaces have different data transfer rates; and
direct a receiving one of the first and second data interfaces to continue retrieving the data from the data buffer based on the ability of the data buffer to transfer data.

11. The computer readable medium of claim 9, further comprising instructions that direct the processor:
the first data interface is a Peripheral Component Interconnect Express interface function and the second data interface is a backend function interface; and
the method is operable within the Peripheral Component Interconnect Express interface.

12. The computer readable medium of claim 9, further comprising instructions that direct the processor:
computing a size of the elasticity first-in-first-out buffer based on a data rate differential between the first and second data interfaces; and
changing the data buffer according to the computed size.

* * * * *